United States Patent [19]

Bindin et al.

[11] 4,383,013
[45] May 10, 1983

[54] HIGH TEMPERATURE MULTICELL ELECTROCHEMICAL STORAGE BATTERIES

[75] Inventors: Peter J. Bindin, Runcorn; Ivor W. Jones, Chester, both of England

[73] Assignee: Chloride Silent Power Limited, London, England

[21] Appl. No.: 283,309

[22] Filed: Jul. 14, 1981

[30] Foreign Application Priority Data

Jul. 23, 1980 [GB] United Kingdom ............... 8024119

[51] Int. Cl.³ .............................................. H01M 6/36
[52] U.S. Cl. ................................. 429/112; 429/104; 429/120
[58] Field of Search ........................ 429/104, 101–103, 429/120, 112

[56] References Cited

U.S. PATENT DOCUMENTS

| 3,525,386 | 8/1970 | Grover | 429/120 X |
| 3,885,989 | 5/1975 | Bush | 429/104 |
| 4,137,376 | 1/1979 | Clegg et al. | 429/104 |
| 4,235,956 | 11/1980 | Gross et al. | 429/112 |
| 4,314,008 | 2/1982 | Blake | 429/120 X |

Primary Examiner—Charles F. LeFevour
Attorney, Agent, or Firm—Beveridge, DeGrandi & Kline

[57] ABSTRACT

A battery module for a sodium sulphur battery containing a plurality of cells comprises a container housing the cells with an evacuated region between the cells and the walls of the container, this evacuated region containing a plurality of layers of metal foil between the cells and the wall. At least one tube extends through the module in contact with the cells for conveying a thermally-conductive fluid by means of which the cells can be heated or cooled.

15 Claims, 4 Drawing Figures

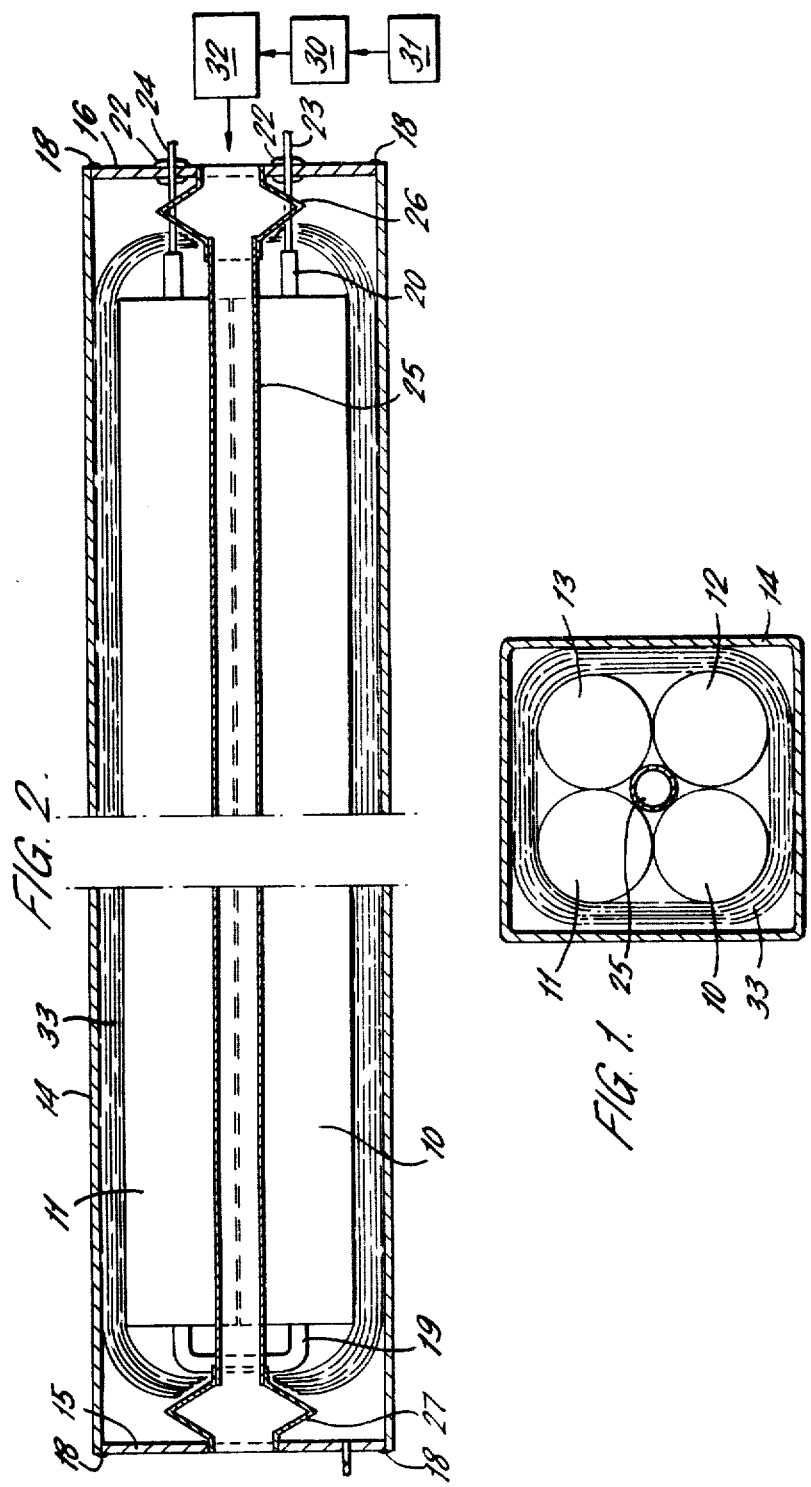

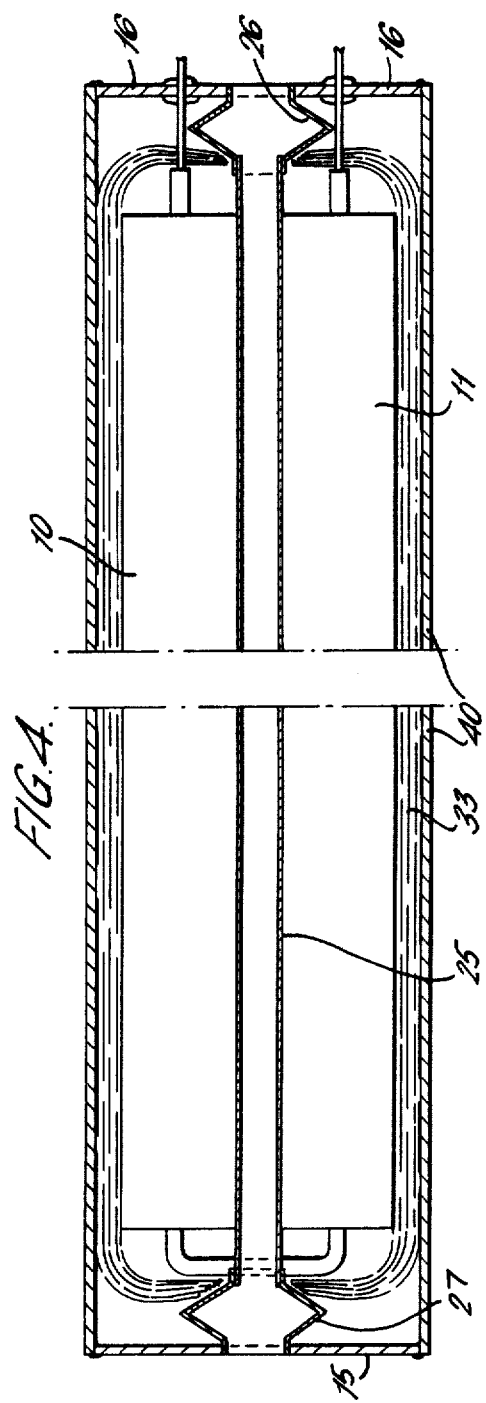
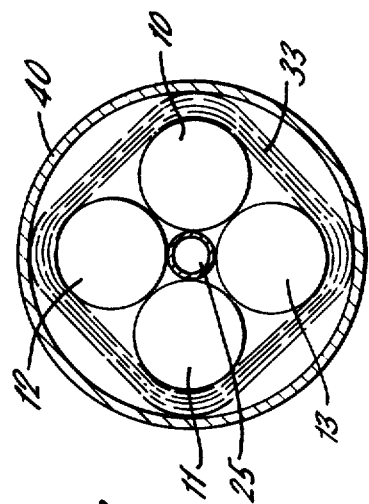

HIGH TEMPERATURE MULTICELL ELECTROCHEMICAL STORAGE BATTERIES

BACKGROUND OF THE INVENTION

1. Field of the Invention

This invention relates to high temperature multicell electrochemical storage batteries.

A high temperature battery operates at a temperature above ambient. A typical example of such a battery is one using a molten alkali electrode where in order to operate, the temperature of each cell must be above the melting point of the alkali metal. The invention has particular application to batteries, such as sodium sulphur batteries which are capable of high rates of charge and discharge.

A high temperature storage battery has to be provided with heating means so that it can initially be raised to the required temperature. However, when a battery is charging or discharging, due to the internal resistance, heat is developed inside each cell and hence, during normal operation the temperature of the battery would rise unless heat is removed. The normal practice is to allow the excess heat to be dissipated through the cell wall and, in the case of a multicell battery, through the battery housing.

Since batteries may be used intermittently they must not be cooled too quickly as they might fall below the minimum temperature for operation. It has therefore been proposed to provide insulation around individual cells or around a battery of cells to prevent or at least delay cooling of the cells. The provision of such thermal insulation however inhibits effective cooling if the cell should overheat for any reason.

2. Prior Art

These considerations lead to designing the housing wall as a compromise between the requirements for heat transmission and thermal insulation. In U.K. Specification No. 2020087, which is an example of such a compromise, insulation for a multicell storage battery is provided by a vacuum compartment within the housing wall and, to deal with the problem of possible overheating, hydrogen is admitted into the vacuum compartment to give thermal conduction. The hydrogen is normally absorbed on a material such as palladium. To release the hydrogen, the palladium has to be heated to a temperature above the operating temperature of the cell. To render the insulation system re-effective, the hydrogen storage system must be cooled down so that the gas is re-absorbed. Such an arrangement however still requires that heat must be transferred through the battery housing. This limits the number of cells which can be provided within the housing since it is undesirable to have any cell remote from the heat transfer means. Furthermore if a large battery is to be formed of a plurality of multicell modules with heat transfer through the housing for each module, then provision has to be made for heat transfer from the outer surfaces of the various individual modules, preventing close stacking of the modules.

SUMMARY OF THE INVENTION

According to the present invention a multicell high temperature electrochemical storage battery comprises an evacuated container within which is housed a plurality of cells with an evacuated region between the cells and a wall of the container, this region including radiation inhibiting means between the cells and said wall, and at least one flow passage through the container for heating or cooling means. Said at least one flow passage may be a tube or tubes of thermally conductive material forming a passageway through the container for a heating and/or cooling fluid. If the cells are elongate cylindrical cells, they may be arranged parallel to one another and to the tube or tubes and in contact with the tube or tubes. In this case means may be provided for passing or circulating the fluid through the tube or tubes. In some cases, separate heating and cooling means may be provided in said tube, e.g. heating may be effected by an electrically energisable heating element and cooling effected by a fluid, for example a forced draught of air, in an annular region between the heating element and the inner wall of said tube.

Preferably each of the cells is in thermal contact with the aforementioned tube or at least one such tube. The cells preferably have a thermally conductive outer wall, e.g. a metal wall, to facilitate heat transfer between the cells and the thermally conductive fluid. As described later, it may be necessary to provide electrical insulation between the cells and said tube but this may be thin and give little impedance to heat transfer. The radiation inhibiting means may comprise metal foil, preferably a multi-layer foil assembly with adjacent layers insulated from one another to reduce thermal conduction. For example a sandwich of metal foil and a ceramic paper may be used or a multiple layer of foil with an insulating coating on one surface or both surfaces of the foil. The foil most conveniently is aluminium but it is possible to use for example copper foil or iron foil or stainless steel. The ceramic paper may be a paper formed with fibres of a refractory oxide material, e.g. alumina.

With this construction, the vacuum within the housing together with the radiation-inhibiting means provided serves to minimise heat loss from the cells through the battery housing. Temperature control is now effected by control means controlling the flow of a gas or liquid, constituting the aforesaid fluid, which is passed through the tube or tubes. The control means may be operatively responsive to the battery temperature. In one arrangement, a thermally responsive bi-metallic element is used to operate or to constitute a valve closing said tube when the temperature falls below the required operating temperature. Such valves enable individual multi-cell modules of a large battery to be separately controlled automatically. A valve of this nature is particularly convenient when the fluid is circulated through the tube for cooling purposes, heating of the cells for initial starting from cold being effected by other means, e.g. electric heating elements.

The battery conveniently comprises a plurality of elongate cells arranged parallel to one another, conveniently tubular cells, and the aforementioned tube for the heating or cooling fluid extends lengthwise through the housing. The housing thus may be made cylindrical or square in external transverse cross-section and, since there is no heat transfer through the walls of the housing, such batteries can be put side by side to form modules of a battery assembly. This permits of compact packing of the modules.

The cells inside the housing may be electrically interconnected within the housing, for example in series or in parallel or in a series-parallel combination. Conveniently the electrical connections are taken out through one end of the housing. If the cells are connected in series or series-parallel, and if, as is the common practice with sodium-sulphur cells, the housing of the cell constitutes one pole, or terminal of the cell, then individual cells must be electrically insulated from one another. This may readily be achieved by a thin layer of insulating material, e.g. enamel, on the cells or on the aforesaid tube of thermally conductive material. In the latter case, the tube may be provided with fins extending outwardly between the cells to prevent direct contact between adjacent cells. A thin layer of electrical insulating material provides little impedance to heat transfer and the metal fins will improve heat transfer from the cells to the tube.

The housing may comprise a cylindrical or square section container conveniently having straight-sided side walls and closed by end plates, which may be welded to the side walls of the container. The aforementioned tube, to allow for differential thermal expansion and to reduce heat losses, may be sealed to the end walls through a bellows unit or two bellows units inside the container. Conveniently two separate bellows units are provided each bonded at one end into an end plate of the container and at the other end welded to the tube.

BRIEF DESCRIPTION OF THE DRAWINGS

FIG. 1 is a transverse cross-section through one construction of a battery module containing four sodium-sulphur cells;

FIG. 2 is a longitudinal section through the battery module of FIG. 1;

FIG. 3 is a transverse section similar to FIG. 1 of another construction of battery module; and FIG. 4 is a longitudinal section through the battery module of FIG. 3.

DESCRIPTION OF THE PREFERRED EMBODIMENTS

Referring to FIGS. 1 and 2, the battery module comprises four elongate cylindrical sodium-sulphur cells 10, 11, 12, 13 arranged in an outer aluminium container which is of square section with rounded corners as shown in FIG. 1. The container is formed of an element 14 defining the straight parallel sides, the container being closed by two end caps 15, 16 which are welded to the tubular side wall element 14 by welds 18.

The individual cells are externally symmetrical and may be connected in series or parallel or in combined series and parallel arrangement. In the particular embodiment illustrated, the four cells are connected in series. Each cell has an anode terminal at one end and a cathode terminal at the other. The four cells are arranged so that, at each end of the module, two cells have anode terminals and the other two cells have cathode terminals. In FIG. 2, there are shown two cells 10, 11 having poles of opposite polarity connected together by a link 19 at one end of the battery. The other two cells are similarly connected at this end of the battery. At the other end of the battery, two output terminals 20, 21 with connections 23, 24 are taken through glass bushings 22 in the aluminium end cap 16.

Extending centrally through the assembly of cells and in direct thermal contact with the four individual cells is a stainless steel cooling tube 25 which, at its ends, is sealed to stainless steel bellows units 26, 27, these bellows units being bonded into the aluminium end caps 15, 16 respectively, to provide a through passage for the circulation of a coolant fluid, e.g. gas or liquid. The fluid is circulated by circulating means indicated diagrammatically at 30. The coolant may be air or it may be some other fluid which would be recirculated. The fluid flow may be controlled automatically by control means 31 which may be operatively responsive to the temperature of the battery. As indicated at 32 provision is made for heating this fluid to provide the required heating for the battery, if the battery is to be started from cold. The bellows units 26, 27 allow for differential thermal expansion between the stainless steel tube 25 and the battery assembly.

The individual cells 10, 11, 12 and 13 each comprise a metal cylinder containing the anodic and cathodic reactants, that is to say the sodium and the sulphur/sodium polysulphides for a sodium sulphur cell, these reactants being separated by a solid electrolyte. Because the cells in this embodiment are electrically in series, they must be electrically insulated from one another. This may readily be achieved by a thin insulating layer around each cell, e.g. an enamel layer, without significantly reducing thermal conduction. Alternatively insulating separators may be provided between the cells and the tube 25. The separators may be fins on the tube. Metal fins with an insulating coating will assist heat transfer.

The cells are put in direct thermal contact with the cooling tube 25 to facilitate heat transfer. The assembly of cells is wrapped with a sandwich 33 of aluminium foil and ceramic paper which lies between the cells and the inside walls of the housing. The ceramic paper in this embodiment is formed from alumina fibres and was about 0.3 mm thick. This forms an insulating medium with the foil preventing transfer by radiation. The sandwich is formed as a multi-turn spiral of foil and paper. This wrapping also serves to position the cells in the housing, holding them in tight contact with the tube 25. The inside of the housing is evacuated to a pressure which typically is 0.1 torr. The combination of the insulation and the vacuum reduces the heat loss from the cells via the housing walls so that this is negligible. Hence the modules can be packed close together in an assembly forming a large battery. Temperature control is effected by the fluid passed through the central tube and provision may be made for automatic control, e.g. by control means 34 responsive to the temperature of the battery and controlling the fluid flow and/or heating or cooling means for the fluid. The control means may comprise a separate thermally responsive valve, e.g. a bi-metallic element on each tube 25. For a sodium-sulphur cell may be arranged so that it is open if the temperature is above 350° C. and closed if the temperature is below 310° C. Such valves avoid any external mechanical or electrical control system and permit of the flow through each tube 25 of a large battery to be controlled individually.

The square section construction shown in FIGS. 1 and 2 is convenient for forming a large battery assembly from a number of modules. In some cases however it may be preferred to use a cylindrical construction where it may be more convenient to manufacture and is more economical. Such an arrangement is shown in FIGS. 3 and 4. In these figures the same reference numerals are used to indicate corresponding elements. It will be seen however that in this construction, the outer housing 40 is of cylindrical section instead of being of square section as shown in FIGS. 1 and 2.

We claim:

1. A multicell high temperature electrochemical storage battery comprising a container having a wall enclosing an evacuated region, a plurality of cells housed within said container, radiation-inhibiting means located in said container in said evacuated region between the cells and said wall, and at least one flow passage through the container for a heating or cooling means, said flow passage being a tube of thermally conductive material and each of the cells being in thermal contact with said tube and wherein each cell has a thermally conductive outer wall to facilitate heat transfer between the cell and said at least one tube and wherein said radiation-inhibiting means surround the group of cells within the battery housing.

2. A battery as claimed in claim 1 wherein the cells are elongate cells arranged around a tube constituting said flow passage and parallel thereto.

3. A battery as claimed in claim 2 wherein the radiation-inhibiting means are flexible means wrapped around the cells and said tube to hold the cells against said tube.

4. A battery as claimed in claim 1 wherein the radiation-inhibiting means comprise insulated metal foil.

5. A battery as claimed in claim 4 wherein said foil is aluminium foil.

6. A battery as claimed in claim 4 wherein said foil has a thermally insulating coating on at least one face.

7. A battery as claimed in claim 4 wherein said foil is sandwiched with a ceramic paper.

8. A battery as claimed in claim 4 wherein the radiation-inhibiting means comprises multiple layers of metal foil.

9. A battery as claimed in claim 1 having means for passing or circulating a heating and/or cooling fluid through said at least one tube.

10. A battery as claimed in claim 9 and having temperature control means controlling the flow of said fluid in accordance with the battery temperature.

11. A battery as claimed in claim 10 wherein the temperature control means comprise a temperature responsive valve for said tube.

12. A battery as claimed in claim 11 wherein the temperature responsive valve is a bi-metallic element.

13. A battery as claimed in claim 1 and having an electrically energisable heating element in said at least one tube.

14. A battery as claimed in claim 13 and having means for circulating air through said at least one tube as a cooling medium.

15. A battery as claimed in claim 1 wherein said cells are elongate cells arranged parallel to one another and said tube for the heating or cooling fluid extends lengthwise through the housing and wherein the housing has side walls closed by end plates and wherein said tube, to allow for differential thermal expansion, is sealed to the end walls through at least one bellows unit inside the container.

* * * * *